United States Patent [19]

Ono et al.

[11] Patent Number: 5,460,836
[45] Date of Patent: Oct. 24, 1995

[54] METHOD OF PREPARING BEER USING LIPID-REMOVED MALT

[75] Inventors: Miyoko Ono, Takatuki; Kazuya Arakawa, Ibaraki; Susumu Furukubo, Takatuki; Kazuhiro Hamatani, Osaka, all of Japan

[73] Assignee: Suntory Limited, Osaka, Japan

[21] Appl. No.: 101,827

[22] Filed: Aug. 4, 1993

Related U.S. Application Data

[63] Continuation of Ser. No. 868,647, Apr. 15, 1992, abandoned.

[30] Foreign Application Priority Data

Apr. 15, 1991 [JP] Japan ................................ 3-110986

[51] Int. Cl.$^6$ ................................................ C12C 11/00
[52] U.S. Cl. ................ 426/11; 426/16; 426/429; 426/592
[58] Field of Search .................. 426/11, 12, 16, 426/592, 29, 590, 600, 425, 429

[56] References Cited

U.S. PATENT DOCUMENTS

| | | | |
|---|---|---|---|
| 3,939,281 | 2/1976 | Schwengers | 426/11 |
| 4,507,329 | 3/1985 | Grant | 426/600 |

FOREIGN PATENT DOCUMENTS

| | | |
|---|---|---|
| 83497 | 7/1975 | Australia . |
| 2206378 | 6/1974 | France . |
| 2279845 | 2/1976 | France . |
| 837684 | 5/1952 | Germany . |
| 48-27478 | 8/1973 | Japan . |
| 59-21594 | 5/1984 | Japan . |
| 59-78656 | 5/1984 | Japan . |
| 60-133849 | 7/1985 | Japan . |
| 60-188053 | 9/1985 | Japan . |
| 62-55069 | 3/1987 | Japan . |
| 8303425 | 10/1983 | WIPO . |

OTHER PUBLICATIONS

Iemura et al., JP–60–224487, Nov. 1985, Preparation of koji (malt), abstract only.
Taylor et al, J. Inst.Brew., Jul.–Aug. 1979, vol. 85, pp. 219–227.
G. Jackson, J. Inst.Brew., vol. 87, pp. 242–243, Jul.–Aug. 1981.
Anness et al, J. Inst.Brew., vol. 91, pp. 313–317, Sep.–Oct. 1985.
Brewer's Guardian, Aug. 1983, pp. 25–29.
Abstract 73–48632U/34 (Derwent World Patents Index).
Abstract 87–106336/15 (Derwent World Patents Index).
Abstract 83–755463/36 (Derwent World Patents Index).
Abstract 85–279136/45 (Derwent World Patents Index).
Abstract 84–149450/24 (Derwent World Patents Index).
Abstract 84–212535/35 (Derwent World Patents Index).
Patent Abstract of Japan, vol. 10, No. 36, 13 Feb. 1986 & JP–A–60 188 053 (Mitsubishi Kakouki) Sep. 25, 1985.
Patent Abstract of Japan, vol. 10, No. 94, 11 Apr. 1986, & JP–A–60 224 487 (Kikumasamune Shiyuzuo) Nov. 8, 1985.

*Primary Examiner*—Leslie A. Wong
*Attorney, Agent, or Firm*—Birch Stewart Kolasch & Birch

[57] ABSTRACT

The present invention is directed to a malt for brewing beer prepared by removing lipids by using subcritical or supercritical carbon dioxide, a beer using the said malt, and a method of preparing the said beer. In the beer obtained by using the malt prepared by the method of the present invention, wort clarity is good, filtration becomes rapid, and filtration efficiency is improved. Also, the obtained beer has good foam head retention, good foam lacing, a refreshingly clean taste and good flavor stability.

4 Claims, No Drawings

METHOD OF PREPARING BEER USING LIPID-REMOVED MALT

This application is a continuation of application Ser. No. 07/868,647, filed on Apr. 15, 1992, now abandoned.

FIELD OF THE INVENTION

The present invention relates to a lipid-removed malt, a beer using the said malt, and a method of preparing the said beer. More specifically, the present invention relates to a malt whose lipid has been extracted and removed using subcritical or supercritical carbon dioxide, a beer using the said malt, and a method of preparing a beer containing the said malt.

BACKGROUND OF THE INVENTION

It is a well-known fact that the presence of lipid has various adverse effects on the beer quality and the efficiency of beer brewing process. For example, unsaturated fatty acids inhibit the synthesis of ester components, which are yeast-synthesized flavor components, and oxides of linolenic acid, etc. give beer a stale flavor and damage the flavor stability. In addition, lipid is an anti-foaming agent, and decreases the foam forming, foam lacing and foam stability of beer.

Most of such lipids are derived from malt, the major raw material of beer, and they occur in malt and in the beer brewing process in various forms including simple lipids (fatty acids, triglycerides and other neutral lipids), complex lipids (glycolipids and phospholipids) and bound lipids such as those bound with starch grains. However, not all lipids have an adverse effect, i.e., the balance of these forms of lipids subtly affects the beer quality and the efficiency of beer brewing process; it remains unknown what the balance is appropriate. It is also unknown what the degree of total lipid content is preferable if lipids are to be removed.

With the aim of removing these lipids from the raw material to avoid their adverse effects on the preparation of alcoholic beverages, various methods have been attempted, including (1) removal of germs which contain a higher content of lipids from the raw material cereals (polishing), (2) removal of lipids from the raw material cereals by ethanol extraction, (3) pretreatment of the raw material cereals with lipid decomposing enzyme (Japanese Patent Examined Publication No. 22478/1973, Japanese Patent Unexamined Publication No. 55069/1987) or addition of lipid decomposing enzyme during the preparation process (Japanese Patent Examined Publication No. 21594/1984) and (4) removal of lipids by special filtration-separation.

However, all these methods have various problems. For example, polishing is disadvantageous in that increasing the polishing ratio results in an extremely high cost of raw material, and sufficient lipid removal cannot be achieved even when the degree of polishing is increased, because the center of the embryo of the raw material cereals is rich in lipids.

In the case of removal of lipids by ethanol extraction, there is a problem that enzymes in the raw material cereals are greatly damaged so that an additional process such as enzyme replenishment should be necessary because the raw material cereals are kept in contact with a high concentration of ethanol for a long time and high temperature heating is necessary to remove this ethanol.

In the method using a lipid decomposing enzyme, the bad influence of the substances produced upon enzymatic decomposition appears in alcoholic beverages unless the decomposition substances are removed. There has been no method for removing these decomposition substances which is suitable to the preparation of various alcoholic beverages; the existing removal method is troublesome, and requires a very large number of processes. For example, when using lipase, the amount of free fatty acids increases. A high content of these free fatty acids worsens the filterability and inhibits the synthesis of esters which are flavor components of alcoholic beverages. For this reason, a process is necessary to remove the free fatty acids.

Methods for lipid removal by filtration-separation include a method using a lauter tun, in which a spent grain and insoluble substances are used as a filter layer, a method using a mash filter made of fabric or cotton, and centrifugal separation using a centrifuge. Lipid removal ratio increases in this order, though the time required for filtration-separation also increases.

In filtration-separation using a lauter tun, which is the most effective method in lipid removal ratio among these methods, a fair amount of initial filtrate must be returned to the original to form a stiff filtering layer, through which filtration is conducted. It requires a 1.5 to 2 times longer time than filtration-separation using a mash filter and other methods, and in addition, it is very difficult to control the formation of the filtering layer. In filtration-separation using a mash filter, the lipid removal ratio is very low in the initial portion of filtrate. In the case of centrifugation, the lipid removal ratio is very low due to only solid-liquid separation without the filtering layer. In any method, problems are inevitable, i.e., lipids cannot be sufficiently removed, the removal efficiency is extremely poor, much time is consumed, the costs are high, and the control over filtration-separation is impossible.

Of these methods, the filtration-separation method has been only used for beer brewing, but this method cannot be said to be effective for the reasons described above.

On the other hand, various methods based on extraction with subcritical or supercritical carbon dioxide have recently been attempted for removal of lipids from the subject substance. For example, U.S. Pat. No. 3,939,281 describes a method of extracting and removing fats from starch-containing plants by carbon dioxide extraction, and Japanese Patent Unexamined Publication No. 188053/1985 describes the method of treating the raw material brewing rice by carbon dioxide extraction. However, none of these methods has been reported to be applied to malt for beer brewing. Also, to apply this method to malt for beer brewing, it is necessary to avoid damaging of enzymes in the malt, and the problems with regard to which balance of lipids is appropriate and what the degree of total lipid content is preferable remain to be solved, as stated above.

SUMMARY OF THE INVENTION

It is an object of the present invention to provide a malt suitable for beer brewing, wherein lipids, which adversely affect the beer quality and the efficiency of the beer preparation process, have been removed from the malt by a method which permits selective removal of an effective amount of lipids and which does not damage the enzymes in the malt. It is another object of the present invention to provide beer prepared using the said malt. It is another object of the present invention to provide a method of preparing said beer, wherein the filterability of wort is good and the beer flavor stability, foam head retention and foam lacing are good.

The present inventors made investigations to solve the problems described above. As a result, the inventors found that the malt whose lipids have been extracted and removed using subcritical or supercritical carbon dioxide retains the activity of enzymes and can be used in the same manner for ordinary beer brewing, and that wort clarity is good, filtration becomes rapid, filtration efficiency increases, and the beer obtained using this as a raw material has good foam head retention, good foam lacing, a refreshingly clean taste and good flavor stability. The present inventors made further investigations based on this finding, and developed the present invention.

Accordingly, the present invention essentially relates to a malt for beer brewing whose lipids have been removed, the beer containing the said malt, and the method of preparing the beer containing the said malt. Particularly, the present invention relates to the malt whose lipids have been extracted and removed using subcritical or supercritical carbon dioxide as a preferred mode or embodiment of the invention, the beer containing said malt, and the method of preparing a beer containing said malt.

DETAILED DESCRIPTION OF THE INVENTION

In the present invention, a lipid-removed malt means a malt treated by selectively removing the lipids in the malt. Such removal can be achieved by any method without limitation, as long as it efficiently removes lipids, which adversely affect the beer quality and the efficiency of the beer brewing process, while having no effect on the enzymes in malt. Examples of such methods include the use of subcritical or supercritical carbon dioxide as an extracting agent.

In the present invention, the subcritical or supercritical carbon dioxide used as an extracting agent is incombustible, harmless and cheap; it has a critical temperature of 31.3° C. and a critical pressure of 72.9 atm, which makes it easy to handle. In addition, it has a density close to that of a liquid and a high diffusion coefficient close to that of a gas, which characteristics make it possible to rapidly extract a large amount of various compounds with high yield. Moreover, the subcritical or supercritical carbon dioxide is easily separated from the extractant by slightly changing the pressure or temperature, and since a bacteriostatic effect and even a bactericidal effect can be expected as a specific advantage of carbon dioxide, the subcritical or supercritical carbon dioxide is harmless to the human body and sanitary; therefore, it is suitable for use in food and pharmaceuticals, and can be preferably used in the malt of the present invention.

In the present invention, the lipid extraction and removal treatment is carried out under mild temperature and pressure conditions which do not damage the enzyme activity of the malt. The subcritical or supercritical carbon dioxide in the extraction vessel is necessarily kept at a temperature of normally 25° to 65° C., preferably 25° to 60° C., and a pressure of normally 60 to 400 kg/cm$^2$, preferably 100 to 350 kg/cm$^2$. If temperature and pressure are lower than the respective lower limits, efficient lipid extraction is impossible; if they are higher than the respective upper limits, no corresponding effect is obtained, and it is uneconomical due to high equipment cost.

The malt subjected to lipid removal treatment in the present invention may be any one without limitation, as long as it is used for ordinary beer brewing. Also, when using subcritical or supercritical carbon dioxide as an extracting agent in the present invention, the degree of the grain size of the ground malt affects the efficiency in removing the lipids. In general, the smaller the average grain size, the higher the efficiency in removing the lipids; but too small an average grain size poses a problem of high resistance at the passage of the extracting agent. When the average grain size is larger, the efficiency in removing the lipids decreases, though the resistance at the passage of the extracting agent becomes small. Therefore, taking into consideration that this malt is to be used for preparing beer, the ground malt used in the present invention has an average grain size of 5 to 2000 μm, preferably 30 to 1200 μm.

When using subcritical or supercritical carbon dioxide as an extracting agent in the present invention, extraction efficiency can be improved by carrying out the extraction-removal treatment in the presence of ethanol as an entrainer in carbon dioxide. This method offers specifically efficiency of phospholipid extraction in comparison with methods for extraction-removal, without an entrainer. The amount of ethanol added is preferably such that enzymes in the malt are not damaged, normally 1 to 25% by weight, preferably 3 to 20% by weight of carbon dioxide. According to the method described above, the lipids contained in the malt are thus removed. In the present invention, the lipid-removing ratio is normally 20 to 100%, practically 20 to 95%, of total lipids in the malt. In other words, the malt of the present invention thus obtained has a total lipid residual ratio of about 0 to 80%, practically 5 to 80%.

When using subcritical or supercritical carbon dioxide as an extracting agent in the present invention, the apparatus used is not subject to limitation; any known apparatus which is commonly used for extraction may be used. Similarly, when adding ethanol as an entrainer, a known method can be used.

The malt used as a raw material for beer in the present invention includes the malt obtained by the lipid removing treatment of the present invention. In other words, the malt as a raw material for beer may comprise the lipid-removed malt alone or a mixture of untreated malt and the lipid-removed malt.

In the present invention, the residual ratio of total lipid content in the whole malt used as a raw material for beer is defined to be calculated as follows. Although the malt used as a raw material for beer in the present invention may comprise the lipid-removed malt alone or a mixture of ordinary malt (malt without lipid removal) and the lipid-removed malt, as stated above, the residual ratio is defined as a relative percent ratio of the total lipid content in the whole malt used as a raw material of beer brewing relative to the total lipid content in the whole malt when ordinary malt alone is used as a raw material for beer brewing. This residual ratio may be preferably in the range of about 20 to 80%, more preferably 30 to 70%. Residual ratios of under 20% pose a problem of extension of fermentation period; residual ratios exceeding 80% offer no desired effect of the present invention.

The malt whose lipids have been thus extracted and removed using subcritical or supercritical carbon dioxide according to the present invention can be used in the same manner for ordinary beer brewing, because the enzymes in the malt have been hardly damaged. Moreover, when beer is prepared using the malt obtained by the method of the present invention, wort clarity is good, filtration becomes rapid, and filtration efficiency is improved. Also, the obtained beer has good foam head retention, good foam lacing, a refreshingly clean taste and good flavor stability.

EXAMPLES

The present invention is hereinafter described in more detail by means of the following working examples and comparative examples, but the invention is never limited by these examples.

Example 1

Using an extraction vessel having an inside capacity of 100 liters, lipids were extracted and removed from malt. Specifically, 47 kg of ground malt for ordinary beer brewing (median grain size of 1013 μm) was charged in the extraction vessel and subjected to extraction and separation of lipids using supercritical carbon dioxide at an extraction vessel pressure of 200 to 250 $kg/cm^2$ and a temperature of 50° to 55° C., a separator pressure of 50 $kg/cm^2$ and a temperature of 40° C.

After carbon dioxide passage for about 3 hours, lipid-removed malt was obtained in the extraction vessel.

The lipid content of the malt before and after lipid extraction and removal using carbon dioxide was determined by the method of MacMurray, Morrisonn et al. [MacMurray and Morrisonn, Journal of the Science of Food and Agriculture, 21, 520 (1970)]. The results are shown in Table 1. The lipid content of the malt and malt weight were determined on dry weight basis.

45 kg of the malt obtained by the said above extraction and removal treatment of lipids was solely used as the raw material malt, and beer was prepared in accordance with the ordinary method of beer brewing. The beer preparation process using this raw material was observed with respect to wort filtration time, wort clarity and fermentation time. The results are shown in Table 2. Also, the obtained beer was evaluated as to foam quality and sensory test parameters. The results are shown in Table 3. The sensory test was conducted with respect to foam stability, foam lacing, taste (purity), after-taste (refreshing feeling) and flavor stability by a panel of five beer brewers well-trained for sensory tests. Foam lacing was determined by the method described by Junichi Kumada in "Kagaku to Seibutsu", 13, 504 (1975).

Taste (purity) and after-taste (refreshing feeling) were evaluated in the following five grades:

1: Taste is not very clean and after-taste has no refreshing feeling.
2: Taste is not clean and after-taste has almost no refreshing feeling.
3: Usual.
4: Taste is clean and after-taste has refreshing feeling.
5: Taste is very clean and after-taste has very refreshing feeling.

Flavor stability was evaluated in the following five grades after the obtained beer was stored at 40° C. for 5 days.

1: Significantly staled.
2: Staled.
3: Usual.
4: Fresh.
5: Very fresh.

Example 2

Using an extraction vessel having an inside capacity of 100 liters, lipids were extracted and removed from malt. Specifically, 41 kg of ground malt for ordinary beer brewing (median grain size of 413 μm) was charged in the extraction vessel and subjected to extraction and separation of lipids using supercritical carbon dioxide at an extraction vessel pressure of 150 to 200 $kg/cm^2$ and a temperature of 40° to 50° C., a separator pressure of 50 $kg/cm^2$ and a temperature of 40° C. Incidentally, the carbon dioxide incorporated 15% by weight of ethanol as an entrainer.

After carbon dioxide passage for about 3 hours, lipid-removed malt was obtained in the extraction vessel.

The lipid content of the malt before and after lipid extraction and removal using carbon dioxide was determined in the same manner as in Example 1. The results are shown in Table 1.

22.5 kg (50% by weight) of the said above malt obtained by the extraction and removal treatment of lipids and 22.5 kg (50% by weight) of the untreated malt were used as the raw material malt, and beer was prepared in accordance with the ordinary method of beer brewing. The beer preparation process using this raw material was observed in the same manner as in Example 1. The results are shown in Table 2. Also, the obtained beer was evaluated as to foam quality and sensory test parameters in the same manner as in Example 1. The results are shown in Table 3.

Example 3

Using an extraction vessel having an inside capacity of 100 liters, lipids were extracted and removed from malt. Specifically, 47 kg of ground malt for ordinary beer brewing (median grain size of 1013 μm) was charged in the extraction vessel and subjected to extraction and separation of lipids using supercritical carbon dioxide at an extraction vessel pressure of 200 to 250 $kg/cm^2$ and a temperature of 50° to 55° C., a separator pressure of 50 $kg/cm^2$ and a temperature of 40° C. Incidentally, the carbon dioxide incorporated 5% by weight of ethanol as an entrainer.

After carbon dioxide passage for about 3 hours, lipid-removed malt was obtained in the extraction vessel.

The lipid content of the said above malt before and after lipid extraction and removal using carbon dioxide was determined in the same manner as in Example 1. The results are shown in Table 1.

45 kg of the malt obtained by the said above extraction and removal treatment of lipids was solely used as the raw material malt, and beer was prepared in accordance with the ordinary method of beer brewing. The beer preparation process using this raw material was observed in the same manner as in Example 1. The results are shown in Table 2. Also, the obtained beer was evaluated as to foam quality and sensory test parameters in the same manner as in Example 1. The results are shown in Table 3.

Example 4

Using an extraction vessel having an inside capacity of 100 liters, lipids were extracted and removed from malt. Specifically, 37 kg of ground malt for ordinary beer brewing (median grain size of 181 μ m) was charged in the extraction vessel and subjected to extraction and separation of lipids using supercritical carbon dioxide at an extraction vessel pressure of 200 $kg/cm^2$ and a temperature of 35° to 45° C., a separator pressure of 50 $kg/cm^2$ and a temperature of 40° C. Incidentally, the carbon dioxide incorporated 15% by weight of ethanol as an entrainer.

After carbon dioxide passage for about 2.5 hours, lipid-removed malt was obtained in the extraction vessel.

The lipid content of said above malt before and after lipid extraction and removal using carbon dioxide was determined in the same manner as in Example 1. The results are shown in Table 1.

29.25 kg (65% by weight) of said above malt obtained by the extraction and removal treatment of lipids and 15.75 kg (35% by weight) of the untreated malt were used as the raw material malt, and beer was prepared in accordance with the ordinary method of beer brewing. The beer preparation process using this raw material was observed in the same manner as in Example 1. The results are shown in Table 2. Also, the obtained beer was evaluated as to foam quality and sensory test parameters in the same manner as in Example 1. The results are shown in Table 3.

Example 5

38.5 kg (85.6% by weight) the said above malt obtained by the extraction and removal treatment of lipids in the same manner as in Example 4, and 6.5 kg (14.4% by weight) of the untreated malt, the same untreated one as in Example 4, were used as the raw material malt, and beer was prepared in accordance with the ordinary method of beer brewing. The beer preparation process using this raw material was observed in the same manner as in Example 1. The results are shown in Table 2. Also, the obtained beer was evaluated as to foam quality and sensory test parameters in the same manner as in Example 1. The results are shown in Table 3.

Comparative Example 1

45 kg of the untreated malt in Example 1 was used solely as a raw material, and beer was prepared in accordance with the ordinary method of beer brewing. The beer preparation process using this raw material was observed in the same manner as in Example 1. The results are shown in Table 2. Also, the obtained beer was evaluated as to foam quality and sensory test parameters in the same manner as in Example 1. The results are shown in Table 3.

Comparative Example 2

22.5 kg (50% by weight) of said above malt obtained by the extraction and removal treatment of lipids in the same manner as in Example 1, and 22.5 kg (50% by weight) of the untreated malt in Example 1 were used as raw materials, and beer was prepared in accordance with the ordinary method of beer brewing. The beer preparation process using this raw material was observed in the same manner as in Example 1. The results are shown in Table 2. Also, the obtained beer was evaluated as to foam quality and sensory test parameters in the same manner as in Example 1. The results are shown in Table 3.

TABLE 1

| Lipid Content | Example 1 | Example 2 | Example 3 | Example 4 |
|---|---|---|---|---|
| Malt (Untreated) | 2.23% | 2.23% | 2.23% | 2.23% |
| Lipid-Extracted and Removed Malt (% by weight) | 1.57% | 0.85% | 1.30% | 0.41% |
| Lipid-Removing Ratio | 29.6% | 61.9% | 41.7% | 81.6% |

Note:
Lipid-removing ratio is obtained by the following formula:

$$\frac{\text{(Lipid Content of Untreated Malt)} - \text{(Lipid Content of Lipid-Extracted and Removed Malt)}}{\text{Lipid Content of Malt (Untreated)}}$$

TABLE 2

|  | Wort Filtration Time (minute) | Wort Clarity (EBC Unit) | Fermentation Time (day) |
|---|---|---|---|
| Example 1 | 110 | 12 | 10 |
| Example 2 | 115 | 12 | 10 |
| Example 3 | 80 | 10 | 10 |
| Example 4 | 75 | 9 | 10 |
| Example 5 | 100 | 9 | 12 |
| Comparative Example 1 | 150 | 15 | 10 |
| Comparative Example 2 | 140 | 14 | 10 |

Note: EBC unit: European Brewery Convention's unit
Fermentation was carried out at a temperature of 10° C.

TABLE 3

|  | Example 1 | Example 2 | Example 3 | Example 4 | Example 5 | Comp. Example 1 | Comp. Example 2 |
|---|---|---|---|---|---|---|---|
| Foam Stability (R&C) | 128 | 130 | 135 | 137 | 145 | 120 | 122 |
| Foam Lacing | 134 | 140 | 150 | 170 | 170 | 114 | 120 |
| Taste (Purity) | 4.0 | 4.0 | 4.5 | 4.5 | 4.0 | 3.5 | 3.5 |
| After-Taste | 3.5 | 4.0 | 4.0 | 4.0 | 3.5 | 3.5 | 3.5 |
| Flavor Stability | 3.5 | 3.5 | 4.0 | 4.5 | 4.5 | 2.5 | 3.0 |
| Total Lipid Residual Ratio (%) | 70.4 | 69.1 | 58.3 | 47.0 | 30.2 | 100 | 85.2 |

Note: Foam stability was evaluated by the method in accordance with the one described in S. Ross, G.L. Clark, Wallerstein Lob. Commn., Vol. 2, No. 6, p.46 (1939).

What is claimed is:
1. A method for preparing a beer, comprising:
extracting and removing lipids from a malt using subcritical or supercritical carbon dioxide at a temperature of 25° to 65° C. and a pressure of 60 to 400 kg/cm$^2$ to obtain a lipid removed malt and to prevent damage of enzymes present in said lipid removed malt;

preparing a malt raw material feedstock for preparing beer comprising said lipid-removed malt, wherein said malt raw material feedstock has a total lipid residual ratio of 20 to 80% based on said malt raw material feedstock; and brewing beer from said malt raw material feedstock.

2. The method according to claim 1, wherein ethanol is added as an entrainer to the subcritical or supercritical carbon dioxide.

3. The method according to claim 1, wherein the malt used as the raw material for preparing beer consists only of lipid removed malt.

4. The method according to claim 1, wherein the malt used as the raw material comprises the mixture of lipid removed malt and untreated malt.

* * * * *